(12) United States Patent
Young

(10) Patent No.: US 8,263,863 B2
(45) Date of Patent: Sep. 11, 2012

(54) CABLE RADIUS ANCHOR FOR WIRE MESH BASKET TRAY

(75) Inventor: Joshua James Young, Austin, TX (US)

(73) Assignee: Chatsworth Products, Inc., Westlake Village, CA (US)

( * ) Notice: Subject to any disclaimer, the term of this patent is extended or adjusted under 35 U.S.C. 154(b) by 262 days.

(21) Appl. No.: 12/652,186

(22) Filed: Jan. 5, 2010

(65) Prior Publication Data

US 2010/0171004 A1    Jul. 8, 2010

Related U.S. Application Data

(60) Provisional application No. 61/142,612, filed on Jan. 5, 2009.

(51) Int. Cl.
*H02G 3/04* (2006.01)

(52) U.S. Cl. ..... 174/68.1; 174/68.3; 174/135; 248/68.1; 248/73; 385/135

(58) Field of Classification Search ............ 174/480, 174/481, 68.1, 68.3, 72 A, 135, 97, 95, 99 R; 211/26; 248/68.1, 49, 51, 53, 73; 385/134, 385/135; 29/428
See application file for complete search history.

(56) References Cited

U.S. PATENT DOCUMENTS

| | | |
|---|---|---|
| 840,009 A | 1/1907 | Peirce |
| 3,042,351 A | 7/1962 | DuBois |
| 3,066,902 A | 12/1962 | Conil |
| 3,676,572 A | 7/1972 | Davies |
| 4,013,253 A | 3/1977 | Perrault et al. |
| 4,039,131 A | 8/1977 | Perrault et al. |
| 4,136,257 A | 1/1979 | Taylor |
| 4,675,900 A | 6/1987 | Temkin |
| 4,709,888 A | 12/1987 | Cubit et al. |
| 5,024,251 A | 6/1991 | Chapman |
| 5,384,937 A | 1/1995 | Simon |
| D359,443 S | 6/1995 | Johansson |
| 5,531,410 A | 7/1996 | Simon |
| 5,740,994 A | 4/1998 | Laughlin |
| 5,779,198 A | 7/1998 | Rutherford et al. |
| 5,899,041 A | 5/1999 | Durin |
| 5,927,658 A | 7/1999 | Gerster |
| 5,953,870 A | 9/1999 | Jette |
| 5,961,081 A | 10/1999 | Rinderer |
| 6,023,024 A | 2/2000 | Stjerneby |
| 6,061,884 A | 5/2000 | Ohms et al. |
| 6,082,690 A | 7/2000 | Durin et al. |

(Continued)

FOREIGN PATENT DOCUMENTS

CA    1337647 C    11/1995

(Continued)

*Primary Examiner* — Angel R Estrada

(74) *Attorney, Agent, or Firm* — Tillman Wright, PLLC; James D. Wright; Chad D. Tillman

(57) ABSTRACT

A cable radius anchor for providing cable transition to and from a wire mesh basket tray includes a mounting portion and a drop portion. The mounting portion has an undercut tab at an outer edge thereof for adjoining placement relative to a first wire of the wire mesh basket tray, and the drop portion extends from the mounting portion and is configured to curve away from the mounting portion. The drop portion includes drop ears at each side thereof for adjoining placement relative to at least one additional wire of the wire mesh basket tray that is transverse to the first wire. The drop portion has a width greater than a width of the mounting portion.

17 Claims, 4 Drawing Sheets

U.S. PATENT DOCUMENTS

| | | | |
|---|---|---|---|
| 6,138,961 A | 10/2000 | Zweig | |
| 6,193,434 B1 | 2/2001 | Durin et al. | |
| 6,239,364 B1 | 5/2001 | Nickel | |
| 6,247,871 B1 | 6/2001 | Nickel et al. | |
| 6,285,565 B1 | 9/2001 | Aberg et al. | |
| 6,311,732 B1 | 11/2001 | Nickel | |
| 6,332,594 B2 | 12/2001 | Shelton et al. | |
| 6,340,141 B1 | 1/2002 | Rinderer | |
| 6,347,493 B1 | 2/2002 | Jette | |
| 6,365,834 B1 | 4/2002 | Larsen et al. | |
| 6,388,193 B2 * | 5/2002 | Maynard et al. | 174/135 |
| 6,394,398 B1 | 5/2002 | Reed et al. | |
| 6,401,939 B1 | 6/2002 | Durin | |
| 6,402,418 B1 | 6/2002 | Durin et al. | |
| 6,427,400 B1 | 8/2002 | Greenblatt | |
| 6,449,912 B2 | 9/2002 | Jette | |
| 6,463,704 B1 | 10/2002 | Jette | |
| 6,489,566 B1 | 12/2002 | Durin | |
| 6,501,899 B1 | 12/2002 | Marrs et al. | |
| 6,530,545 B2 | 3/2003 | Deciry et al. | |
| 6,570,092 B2 | 5/2003 | Quertelet | |
| 6,586,680 B1 * | 7/2003 | Nelson | 174/135 |
| 6,590,154 B1 | 7/2003 | Badey et al. | |
| 6,637,165 B2 | 10/2003 | Jette | |
| 6,637,704 B2 | 10/2003 | Jette | |
| 6,672,022 B2 | 1/2004 | Simmons | |
| 6,729,606 B1 | 5/2004 | Durin | |
| 6,855,884 B2 | 2/2005 | Spagnoli et al. | |
| 7,130,521 B2 | 10/2006 | McCrary et al. | |
| 7,168,212 B2 | 1/2007 | Jette | |
| 7,373,759 B1 | 5/2008 | Simmons | |
| 7,476,801 B1 * | 1/2009 | Davis et al. | 248/49 |
| 7,546,987 B2 * | 6/2009 | Sinkoff | 248/68.1 |
| D609,559 S | 2/2010 | Pendergrast et al. | |
| D619,878 S | 7/2010 | Sjoqvist | |
| 7,954,776 B2 * | 6/2011 | Davis et al. | 248/49 |
| 8,097,808 B2 * | 1/2012 | Quertelet et al. | 174/97 |
| 2001/0002689 A1 | 6/2001 | Shelton et al. | |
| 2002/0184843 A1 | 12/2002 | Jette | |
| 2003/0108385 A1 | 6/2003 | Finco et al. | |
| 2003/0156892 A1 | 8/2003 | Finco et al. | |
| 2003/0192842 A1 | 10/2003 | Suttles | |
| 2004/0050808 A1 | 3/2004 | Krampotich et al. | |
| 2004/0055232 A1 | 3/2004 | Jette | |
| 2004/0056157 A1 | 3/2004 | Dufourg | |
| 2004/0144898 A1 | 7/2004 | Spagnoli | |
| 2004/0245411 A1 | 12/2004 | Phelan et al. | |
| 2005/0063775 A1 | 3/2005 | Boltz | |
| 2006/0038091 A1 | 2/2006 | Winn et al. | |
| 2006/0269210 A1 | 11/2006 | Waszak | |
| 2007/0164181 A1 | 7/2007 | Deciry et al. | |
| 2008/0017760 A1 | 1/2008 | Larsen et al. | |
| 2008/0023212 A1 | 1/2008 | Larsen et al. | |

FOREIGN PATENT DOCUMENTS

| | | | |
|---|---|---|---|
| EP | 0418167 A1 | 3/1989 | |
| EP | 0298825 A1 | 4/1992 | |
| EP | 0298825 B1 | 4/1992 | |
| ES | 2007578 T3 | 1/1992 | |
| ES | 2122829 A1 | 12/1998 | |
| FR | 2617341 A1 | 12/1988 | |
| FR | 2711208 A1 | 4/1995 | |
| GB | 981072 A | 1/1965 | |
| IT | MI94A02059 | 10/1994 | |
| PT | 87843 B | 5/1989 | |

* cited by examiner

CABLE RADIUS ANCHOR FOR WIRE MESH BASKET TRAY

CROSS-REFERENCE TO RELATED APPLICATION

The present application is a U.S. nonprovisional patent application of, and claims priority under 35 U.S.C. §119(e) to, U.S. provisional patent application Ser. No. 61/142,612, filed Jan. 5, 2009, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

1. Field of the Invention

The present invention generally relates to a cable radius anchor for providing a radial transition from a cable pathway, and more particularly to a cable radius anchor for use in connection with providing a radial transition from a wire mesh basket tray.

2. Background

Wire mesh basket trays for routing cables and other wires are generally known. Exemplary such trays are configured as a series of individual troughs attached together in end-to-end relationship to define a path for cables. Each individual trough is assembled from a mesh configuration of spaced-apart longitudinal wires and spaced-apart transverse cross wires, which are each typically composed of metal. Transverse cross wires are arranged to have a general "U" shape and are welded to the longitudinal wires at intersection points, thereby defining the structure of the trough. The general "U" shape in the longitudinal direction provides the trough with a bottom for supporting cables and two lateral sides. Individual troughs are then attached end-to-end to form a basket tray for routing cables of any desired length or configuration.

Basket trays, upon assembly, may be employed for use in routing cables in a variety of ways within a data center, such as beneath a raised floor environment or suspended overhead. Cables supported in the basket tray may be transitioned to and from the cable pathway of the basket tray relative to cable management racks and other electronic equipment in the data center. Transition to and from the cable pathway may be accomplished by dropping one or more of the cables between adjacent wires of the basket tray, which is typically aided by the inclusion of a cable radius anchor mounted on the basket tray. Known cable radius anchors include a mounting portion that attaches the cable radius anchor to the basket tray and a rounded drop portion that eliminates sharp bends where cables enter into and exit from the cable pathway of the basket tray. In this manner, the rounded bend radius of the drop portion reduces the negative impact of excess bending as cables enter and exit the cable pathway of the basket tray.

Known cable radius anchors also present a number of drawbacks that limit their overall effectiveness. Many known cable radius anchors require the use of separate fasteners, such as pins or splice bolts, to physically mount the cable radius anchor to the basket tray. The use of fasteners in attaching the cable radius anchor to the basket tray increases the installation time. Other known cable radius anchors limit the size of the drop portion so as to fit between adjacent wires of the mesh. In this regard, such cable radius anchors are typically much more narrow than the mesh of the basket tray upon which they are mounted. Still other known cable radius anchors require cutting of the mesh in order to allow the radius anchor to be fitted, which damages the integrity of the basket tray.

A need exists for a cable radius anchor wider than the narrowest mesh of a basket tray that can be mounted to or installed on the basket tray toollessly without cutting the mesh of the basket tray. This, and other needs, is addressed by one or more aspects of the present invention.

SUMMARY OF THE INVENTION

The present invention includes many aspects and features. Moreover, while many aspects and features relate to, and are described in, the context of cable radius anchors for use in connection with a wire mesh basket tray, the present invention is not limited to use only in connection with wire mesh basket trays, as will become apparent from the following summaries and detailed descriptions of aspects, features, and one or more embodiments of the present invention.

Broadly defined, the present invention according to one aspect includes a cable radius anchor substantially as shown and described.

Broadly defined, the present invention according to another aspect includes a cable radius anchor for providing cable transition that includes a mounting portion configured for attachment relative to a bottom portion of a wire mesh basket tray and a drop portion attached to the mounting portion and configured to curve downwardly away from the mounting portion. The mounting portion has an undercut tab at an outer edge thereof for placement relative to a wire of the wire mesh basket tray. The drop portion has extending ears at each side thereof and a width greater than a width of the mounting portion.

In features of this aspect, the cable radius anchor may further include locking tabs for securement of the mounting portion to the wire mesh basket tray; the cable radius anchor may further include one or more accessory apertures; the mounting portion may be attachable to the wire mesh basket tray toollessly; the mounting portion may facilitate mounting of the cable radius anchor in a front-to-back configuration relative to the wire mesh basket tray; the mounting portion may facilitate mounting of the cable radius anchor in a side configuration relative to the wire mesh basket tray; and the cable radius anchor may further include strengthening ribs.

Broadly defined, the present invention according to another aspect includes a cable radius anchor for providing cable transition that includes a mounting portion configured for attachment relative to a bottom portion of a wire mesh basket tray, a drop portion attached to the mounting portion and configured to curve downwardly away from the mounting portion, and locking tabs for securement of the mounting portion to the wire mesh basket tray. The mounting portion has an undercut tab at an outer edge thereof for placement relative to a wire of the wire mesh basket tray. The drop portion has extending ears at each side thereof.

In features of this aspect, the width of the drop portion may change variably; the width of the drop portion may change uniformly; the cable radius anchor may further include one or more accessory apertures; the mounting portion may be attachable to the wire mesh basket tray toollessly; the mounting portion may facilitate mounting of the cable radius anchor in a front-to-back configuration relative to the wire mesh basket tray; the mounting portion may facilitate mounting of the cable radius anchor in a side configuration relative to the wire mesh basket tray; and the cable radius anchor may further include strengthening ribs.

Broadly defined, the present invention according to another aspect includes a cable radius anchor that includes a mounting portion configured for toolless attachment relative to a bottom portion of a wire mesh basket tray and a drop portion attached to the mounting portion and configured to curve downwardly away from the mounting portion.

In features of this aspect, the drop portion may have a width greater than a width of the mounting portion; the cable radius anchor may further include locking tabs for securement of the mounting portion to the wire mesh basket tray; the cable radius anchor may further include one or more accessory apertures; the mounting portion may facilitate mounting of the cable radius anchor in a front-to-back configuration relative to the wire mesh basket tray; the mounting portion may facilitate mounting of the cable radius anchor in a side configuration relative to the wire mesh basket tray; and the cable radius anchor may further include strengthening ribs.

Broadly defined, the present invention according to another aspect includes a wire mesh basket tray having a cable radius anchor installed thereon substantially as shown and described.

Broadly defined, the present invention according to still another aspect includes a method of installing a cable radius anchor in a wire mesh basket tray substantially as shown and described.

Broadly defined, the present invention according to still yet another aspect includes a method of toollessly installing a cable radius anchor in wire mesh basket tray. The method includes inserting a mounting portion of the cable radius anchor through a mesh opening in the wire mesh basket tray such that a drop portion of the cable radius anchor extends beneath a bottom portion of the wire mesh basket tray; pushing the cable radius anchor to engage an undercut tab of the mounting portion relative to a wire of the wire mesh basket tray; and locking one or more locking tabs relative to one or more wires of the wire mesh basket tray.

In features of this aspect, the method may further include twisting the cable radius anchor to permit engagement of adjacent wires of the wire mesh basket tray within a pair of slots at either side of the drop portion of the cable radius anchor; and the method may further include untwisting the cable radius anchor to arrange the mounting portion generally flatly relative to the bottom portion of the wire mesh basket tray.

In addition to the aforementioned aspects and features of the present invention, it should be noted that the present invention further encompasses the various possible combinations and subcombinations of such aspects and features.

BRIEF DESCRIPTION OF THE DRAWINGS

One or more preferred embodiments of the present invention now will be described in detail with reference to the accompanying drawings, which are not necessarily to scale, wherein the same elements are referred to with the same reference numerals, and wherein.

DETAILED DESCRIPTION

Figure 1:
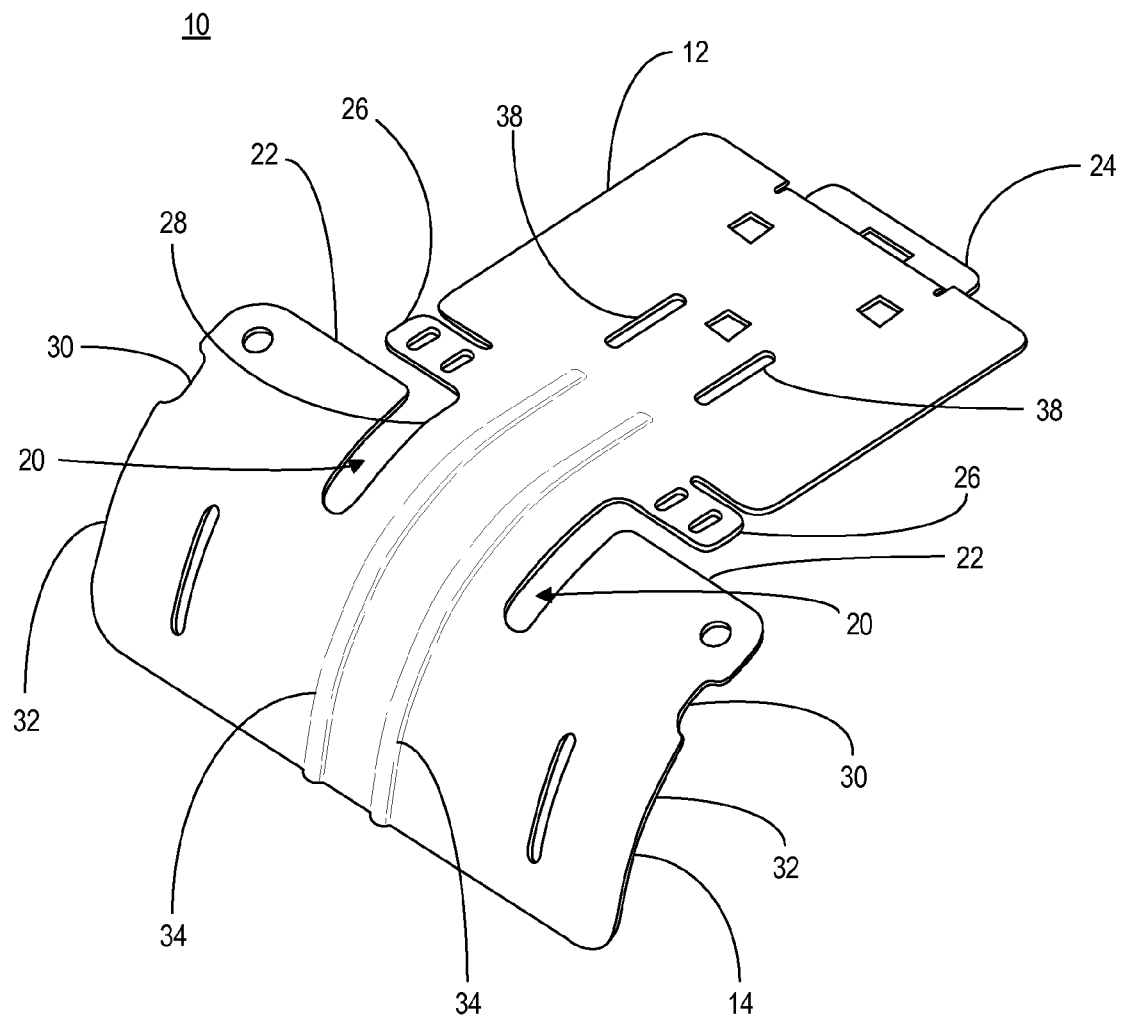
FIG. 1 is a perspective view of an embodiment of a cable radius anchor in accordance with one or more aspects of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Turning now to the figures, FIG. 1 is a perspective view of an embodiment of a cable radius anchor in accordance with one or more aspects of the present invention. As shown, a cable radius anchor 10 generally includes a mounting portion 12 and a drop portion 14. The mounting portion 12 is sheet-like with a generally flat shape. The mounting portion 12 includes an undercut tab 24 at an end thereof and a pair of locking tabs 26 extending from opposite sides thereof at an end opposite the undercut tab 24. The drop portion 14 is sheet-like with a generally curved shape and is oriented to curve away from the generally flat mounting portion 12. Curvature in the drop portion 14 is selected so as to provide the cable radius anchor 10 with an appropriate bend radius for transitioning cables from a wire mesh basket tray.

The drop portion 14 includes a central arc portion 28 extending away from the mounting portion 12 and having drop ears 32 at either side thereof. The inclusion of drop ears 32 at either side of the central arc portion 28 increases the overall width of the drop portion 14 relative to the mounting portion 12. Extending from each of the drop ears 32 is an extending portion 22 that extends generally adjacent to the central arc portion 28, and thereby defines open wire slots 20 between respective extending portions 22 and the central arc portion 28, the significance of which will be explained in greater detail below. Notches 30 are situated on the outwardly-facing side of the extending portion 22 of each of the drop ears 32.

As discussed above, the drop portion 14 has a width that is greater than the width of the mounting portion 12, thereby providing additional space to support cables to be transitioned to and from a wire mesh basket tray. As shown in FIG. 1, the width of the drop portion 14 may be generally uniform along the length thereof. It is also contemplated that the width of the drop portion 14 may change in a uniform or variable manner along the length thereof, as might be preferred. The cable radius anchor 10 may further include accessory apertures 38 in order to provide flexibility in attaching various optional accessories or cable ties to the cable radius anchor 10. Apertures 38 may be added in any number or size in order to accommodate specific preferred accessories to be used in connection with the cable radius anchor 10. The geometry of the apertures 38, the undercut tab 24, the locking tabs 26, and the notches 30 may be modified as necessary to accommodate use of the cable radius anchor 10 in connection with a wide variety of trays or other cable management devices.

As further shown in FIG. 1, the mounting portion 12 and the drop portion 14 are attached together such that the drop portion 14 extends downwardly away from the mounting portion 12. In particular, the central arc portion 28 of the drop portion attaches to the mounting portion 12 adjacent the pair of locking tabs 26. In a preferred embodiment, the mounting portion 12 and the drop portion 14 are an integral structure.

Strengthening ribs 34 extend from the mounting portion 12 to the drop portion 14 in order to provide the drop portion 14 with additional strength to resist deflection. As shown in FIG. 1, the strengthening ribs 34 may extend substantially the entire length of the drop portion 14. While two ribs 34 are shown, it is contemplated that additional strengthening ribs may be utilized in connection with the radius drop anchor 10 in order to provide added rigidity and support to the structure. The radius drop anchor 10 may be composed of any material that provides sufficient strength and rigidity to the structure when used to support cables transitioned to and from a wire mesh basket tray, such as a metal or metal-based material.

Figure 2:
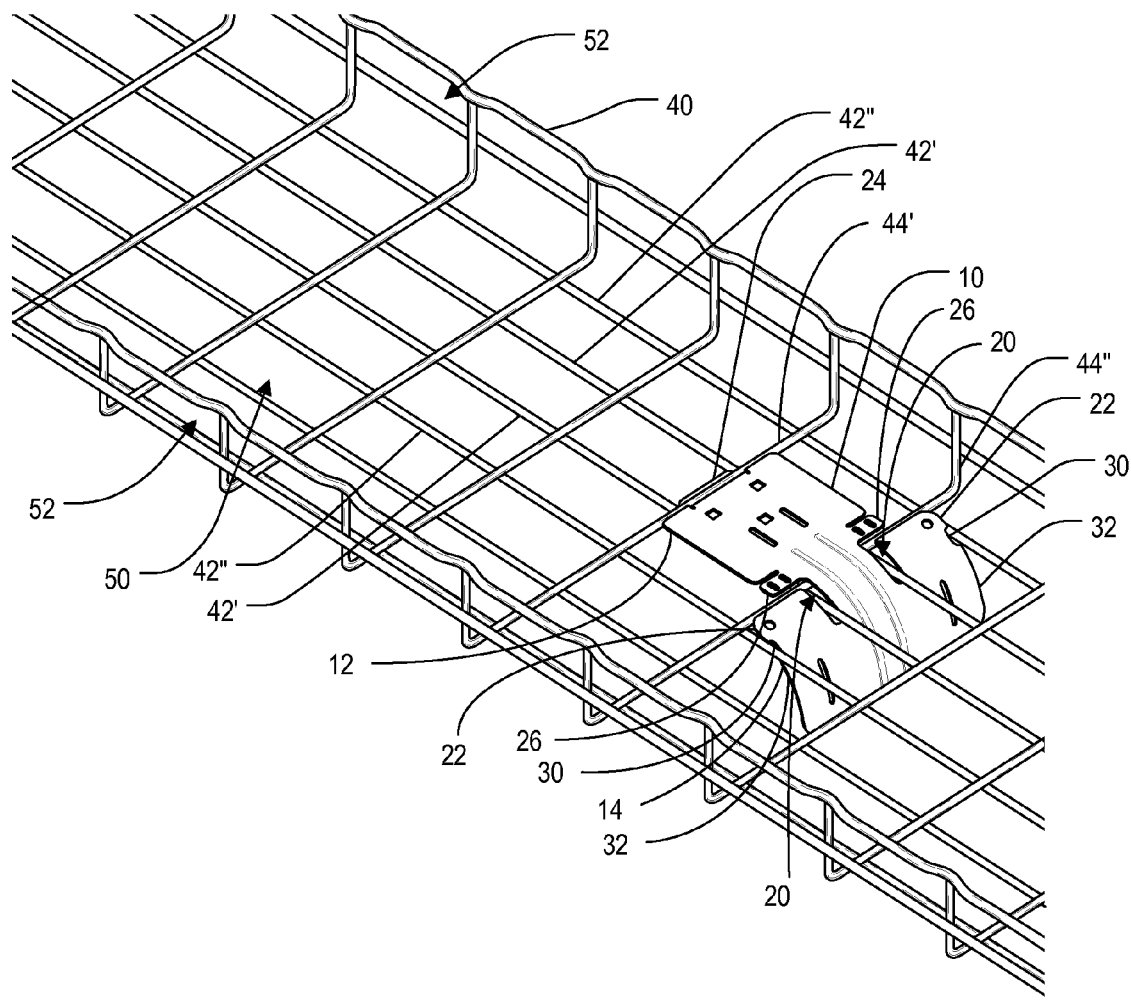
FIG. 2 is a perspective environmental view depicting the cable radius anchor of FIG. 1, shown in a front-to-back configuration relative to a wire mesh basket tray.
Figure 3:
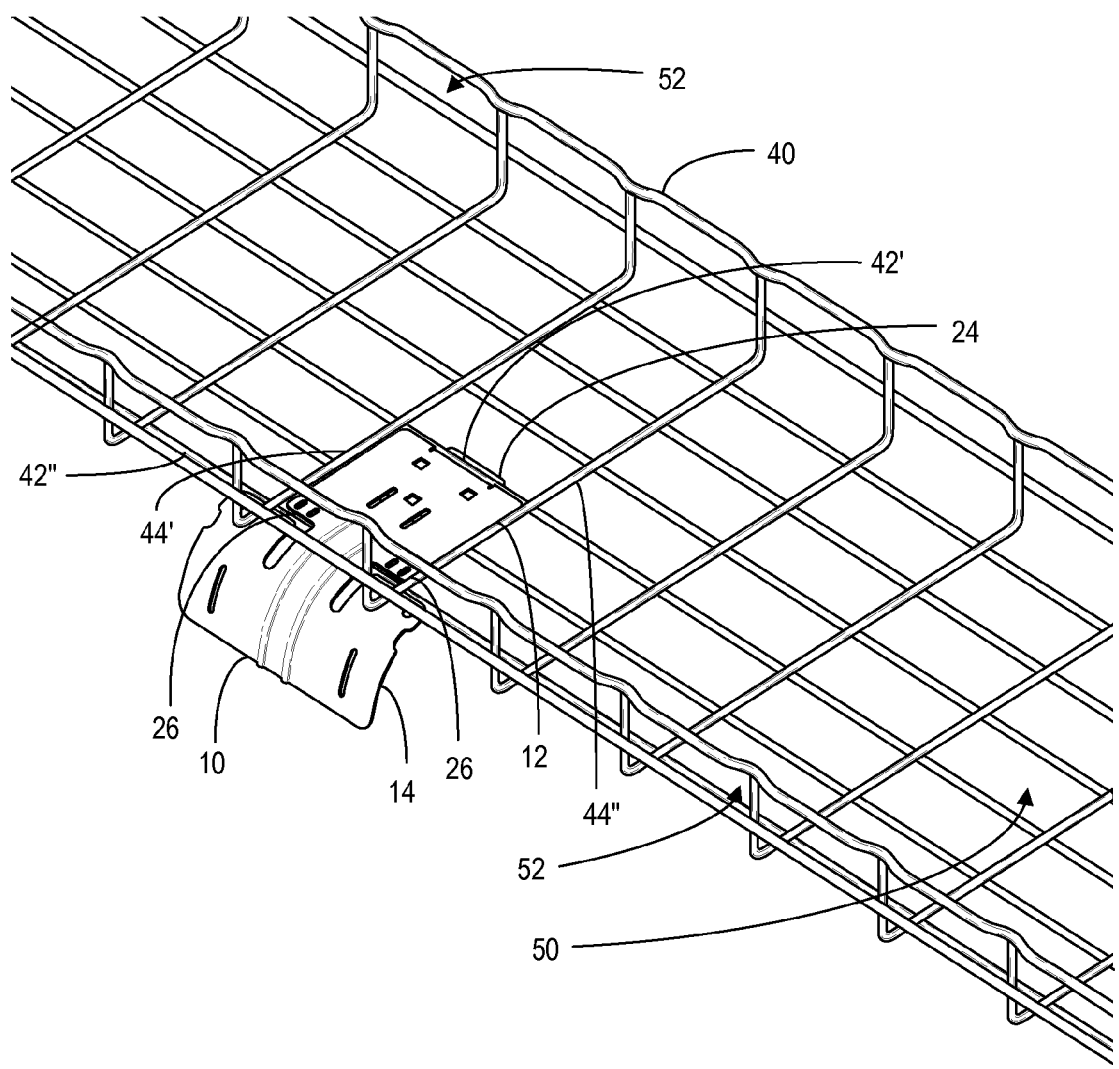
FIG. 3 is a perspective environmental view depicting the cable radius anchor of FIG. 1, shown in a side configuration relative to a wire mesh basket tray.
Figure 4:
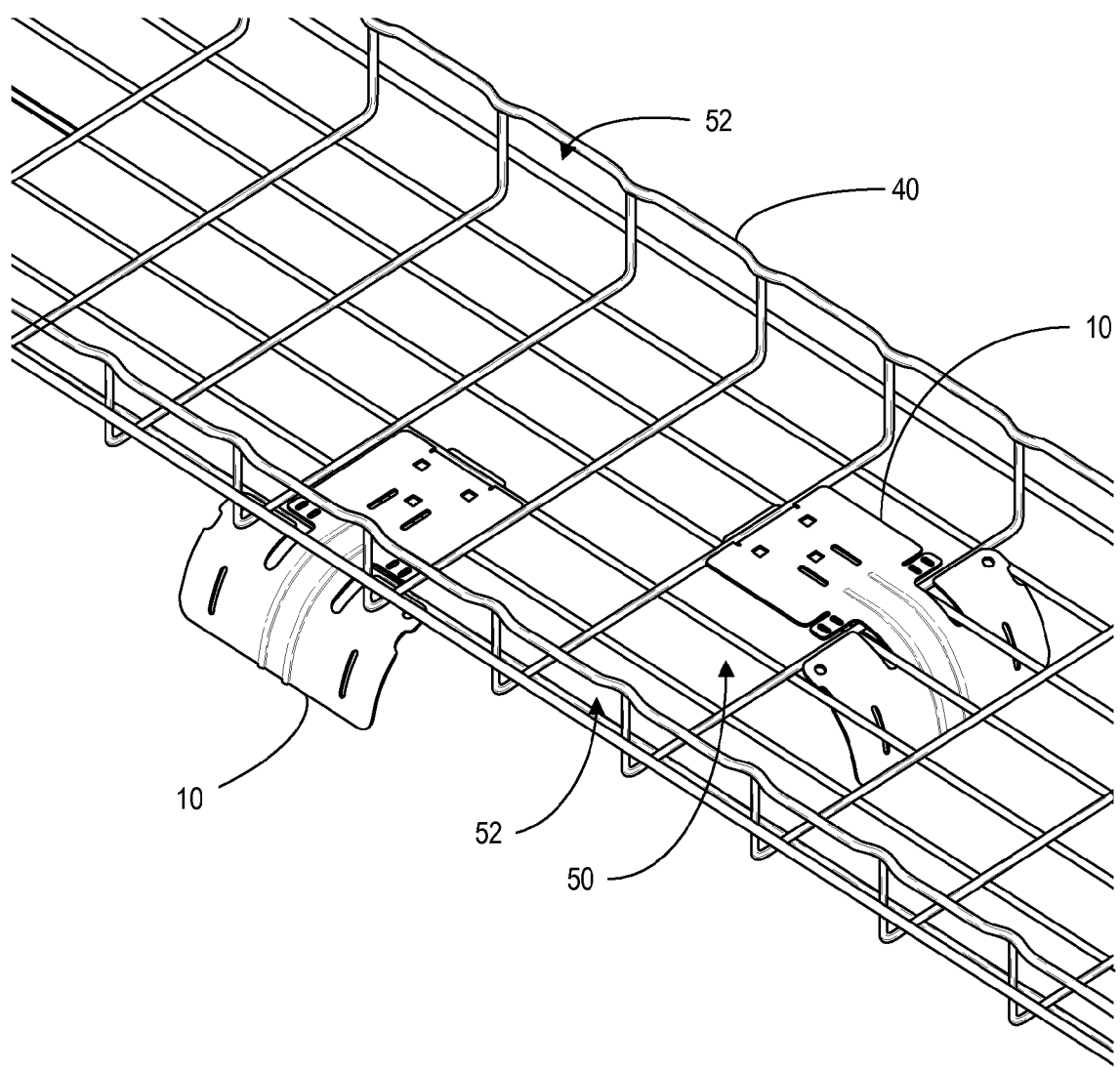
FIG. 4 is a perspective environmental view depicting two cable radius anchors of the type depicted in FIG. 1, one each in the front-to-back and side configurations.

FIGS. 2-4 are perspective environmental views depicting the cable radius anchor 10 of FIG. 1 in a use configuration relative to a wire mesh basket tray 40. As shown in FIGS. 2-4, a wire mesh basket tray 40 is assembled from a mesh configuration of spaced-apart longitudinal wires 42',42" and spaced-apart transverse cross wires 44',44". Transverse cross wires 44',44" are arranged to have a general "U" shape and are attached to the longitudinal wires 42',42" at intersection points, thereby defining the structure of the tray 40. The general "U" shape in the longitudinal direction provides the tray 40 with a bottom 50 for supporting cables and two lateral sides 52. The tray 40 may be assembled from a series of individual troughs that are attached end-to-end to form the desired length or configuration.

In particular, FIG. 2 is a perspective environmental view depicting the cable radius anchor 10 of FIG. 1, shown in a front-to-back configuration relative to a wire mesh basket tray 40. In the front-to-back configuration, the cable radius anchor 10 is situated at the bottom 50 of the tray 40 and oriented to be lengthwise relative to the tray 40. As shown in FIG. 2, the mounting portion 12 is positioned above two adjacent longitudinal wires 42' of the tray 40. The mounting portion 12 is positioned such that the undercut tab 24 at an end thereof is pushed snugly beneath a transverse cross wire 44' intersecting the adjacent longitudinal wires 42'. The undercut tab 24 sets the cable radius anchor 10 and facilitates maintenance of the cable radius anchor 10 in a generally flat position relative to the tray 40.

The central arc portion 28 is sufficiently narrow to fit between the adjacent longitudinal wires 42' on which the mounting portion 12 is positioned. The central arc portion 28 thereby facilitates positioning of the drop portion 14 downwardly beneath the bottom 50 of the tray 40. The adjacent longitudinal wires 42' on which the mounting portion 12 is positioned come to rest in the open wire slots 20 at either side of the central arc portion 28. With the mounting portion 12 and the drop portion 14 in position, the extending portions 22 of the drop ears 32 are situated at either side of the central arc portion 28 between respective sets of adjacent longitudinal wires 42',42". The extending portions 22 of the drop ears 32 are sized to fit snugly between the respective sets of adjacent longitudinal wires 42',42". Notches 30 on the sides of the drop ears 32 engage the outermost longitudinal wires 42" of the respective sets, thereby enabling the drop portion 14 to be set relative to the tray 14.

When the cable radius anchor 10 is fully positioned relative to the tray 40 in the front-to-back configuration, locking tabs 26 may be implemented for securing the cable radius anchor 10 to the tray 40. The locking tabs 26 may be folded downward over the two adjacent longitudinal wires 42' on which the mounting portion 12 is positioned and adjacent another transverse cross wire 44", which itself is not necessarily adjacent to the transverse cross wire 44'. In this manner, the locking tabs 26, in conjunction with the undercut tab 24, inhibit further movement of the cable radius anchor 10 relative to the tray 40, thereby attaching the cable radius anchor 10 to the tray 40 without the aid of tools.

When attached to the tray 40 in the front-to-back configuration, the cable radius anchor 10 engages four adjacent longitudinal wires 42',42" of the tray 40. The mounting portion 12 rests on the two central-most longitudinal wires 42', and the drop portion 14 is arranged relative to each of the four adjacent longitudinal wires 42',42". With the central arc portion 28 extending downwardly through the bottom 50 of the tray 40, the two central-most adjacent longitudinal wires 42' rest in the open wire slots 20 of the drop portion 14. Notches 30 of the extending portions 22 of the drop ears 32 engage the two outermost longitudinal wires 42" of the group of four longitudinal wires. Additionally, the cable radius anchor 10 engages the transverse cross wires 44',44" of the tray 40, which, as mentioned above, may or may not be adjacent. The undercut tab 24 engages transverse cross wire 44' and the locking tabs 26 abut transverse cross wire 44" when folded downward to a locked position in order to secure the cable radius anchor 10 to the tray 40.

When assembled in the front-to-back configuration, the cable radius anchor 10 may be inserted from beneath the tray 40. In this regard, the mounting portion 12 is inserted through a mesh opening defined by adjacent longitudinal wires 42' and transverse cross wires 44',44" of the tray 40. Once through the mesh opening, the cable radius anchor 10 is twisted to allow the adjacent longitudinal wires 42' to twist into the open wire slots 20 of the drop portion 14. The cable radius anchor 10 may then be untwisted to permit the notches 30 of the drop ears 32 to engage two additional longitudinal wires 42" that are adjacent the longitudinal wires 42' that define the mesh opening. With the mounting portion 12 in a generally flat position relative to the bottom 50 of the tray 40, the cable radius anchor 10 may be slid forward to engage the undercut tab 24 beneath the transverse cross wire 44'. To secure the cable radius anchor 10 to the tray 40, the locking tabs 26 may be folded downwardly over the adjacent longitudinal wires 42'.

FIG. 3 is a perspective environmental view depicting the cable radius anchor 10 of FIG. 1, shown in a side configuration relative to a wire mesh basket tray 40. In the side configuration, the cable radius anchor 10 is situated at the bottom 50 of the tray 40 and oriented to be crosswise relative to the tray 40. As shown in FIG. 3, the mounting portion 12 is positioned generally between two adjacent transverse cross wires 44',44" of the tray 40. The mounting portion 12 is positioned such that the undercut tab 24 at the end thereof is pushed snugly beneath a longitudinal wire 42' intersecting the adjacent transverse cross wires 44',44". The undercut tab 24 sets the cable radius anchor 10 and facilitates maintenance of the cable radius anchor 10 in a generally flat position relative to the tray 40.

The central arc portion 28 fits between the adjacent transverse cross wires 44',44" between which the mounting portion 12 is positioned. The central arc portion 28 thereby facilitates positioning of the drop portion 14 downwardly beneath the bottom 50 of the tray 40. The locking tabs 26 may be implemented for securing the cable radius anchor 10 to the tray 40 by folding each locking tab 26 downwardly adjacent another longitudinal wire 42", which itself is not necessarily adjacent to longitudinal wire 42'. In this manner, the locking tabs 26, in conjunction with the undercut tab 24, inhibit further movement of the cable radius anchor 10 relative to the tray 40, thereby attaching the cable radius anchor 10 to the tray 40 without the aid of tools.

When assembled in the side configuration, the cable radius anchor 10 may be inserted from one of the lateral sides 52 of the tray 40 at the lowest mesh opening of the lateral side 52. The mounting portion 12 may be pressed through the mesh opening until the locking tabs 26 are just beyond longitudinal wire 42" and the undercut tab 24 engages beneath longitudinal wire 42'. To secure the cable radius anchor 10 to the tray 40, the locking tabs 26 may be folded downwardly to inhibit movement of the cable radius anchor 10.

The cable anchor radius 10 may be attached to the wire mesh basket tray 40 in many possible locations and configurations. As shown in FIG. 2, the front-to-back configuration permits the cable radius anchor 10 to drop cables beneath a central location of the tray 40. As shown in FIG. 3, the side configuration permits the cable radius anchor 10 to drop cables beneath a side location of the tray 40. FIG. 4 is a perspective environmental view depicting two cable radius anchors 10 of the type depicted in FIG. 1, one each in the front-to-back and side configurations. As shown in FIG. 4, multiple cable radius anchors 10 may be used in connection with a wire mesh basket tray 40 simultaneously in various configurations as might be needed.

As can now be appreciated, the cable radius anchor 10 permits quick and easy installation relative to a wire mesh basket tray 40 in multiple configurations without the aid of tools.

In variations of the cable radius anchor 10 described above, it is contemplated that the cable radius anchor 10 may be attached from above the tray 40 rather than from beneath the tray 40. Furthermore, it is contemplated that the cable radius anchor 10 may be secured by one or more different mechanisms, including tabs that may lock the cable radius anchor 10 when pushed from the side of the cable radius anchor 10 rather than from the front or the back. In this regard, it is further contemplated that carriage bolt apertures may be included in the cable radius anchor to permit the use of carriage bolts to further secure the cable radius anchor with a splice washer or clamp washer, should tool-based securement mechanisms be desired.

In another variation, it is contemplated that the locking tabs 26 may be preloaded or prefolded to engage and lock the cable radius anchor 10 into position once installed on the tray 40.

In still another variation, it is contemplated that the cable radius anchor 10 may be modified so as to have the central arc portion 28 extend beneath a wire 42,44 of the tray 40 rather than above the wire 42,44 as shown in FIGS. 2-4.

In still yet another variation, the undercut tab 24 of the mounting portion 12 may be modified for use in the side configuration. Specifically, the length or depth of the undercut tab 24 may be modified to facilitate a better fit for the cable radius anchor 10 when used in the side configuration.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A cable radius anchor for providing a cable transition path to and from a wire mesh basket tray, comprising:
   (a) a mounting portion having an undercut tab at an outer edge thereof for adjoining placement relative to a first wire of the wire mesh basket tray;
   (b) a drop portion extending from the mounting portion and configured to curve away from the mounting portion, the drop portion having drop ears at each side thereof for adjoining placement relative to at least one additional wire of the wire mesh basket tray that is transverse to the first wire; and
   (c) at least one foldable locking tab for securement of the mounting portion to the wire mesh basket tray;
   (d) wherein the drop portion has a width greater than a width of the mounting portion.

2. The cable radius anchor of claim 1, further comprising one or more accessory apertures extending through at least one of the mounting portion and the drop portion.

3. The cable radius anchor of claim 1, wherein the mounting portion is attachable to the wire mesh basket tray toollessly.

4. The cable radius anchor of claim 1, wherein the mounting portion facilitates mounting of the cable radius anchor in a front-to-back configuration relative to the wire mesh basket tray.

5. The cable radius anchor of claim 1, wherein the mounting portion facilitates mounting of the cable radius anchor in a side configuration relative to the wire mesh basket tray.

6. The cable radius anchor of claim 1, further comprising strengthening ribs extending along at least a portion of the length of the drop portion.

7. The cable radius anchor of claim 1, wherein the width of the drop portion changes variably along the length thereof.

8. The cable radius anchor of claim 1, wherein the width of the drop portion changes uniformly along the length thereof.

9. A cable radius anchor for providing a cable transition path to and from a wire mesh basket tray, comprising:
   (a) a mounting portion configured for toolless attachment relative to the wire mesh basket tray;
   (b) a drop portion extending from the mounting portion and configured to curve away from the mounting portion; and
   (c) at least one foldable locking tab for securement of the mounting portion to the wire mesh basket tray.

10. The cable radius anchor of claim 9, further comprising one or more accessory apertures extending through at least one of the mounting portion and the drop portion.

11. The cable radius anchor of claim 9, wherein the mounting portion facilitates mounting of the cable radius anchor in a front-to-back configuration relative to the wire mesh basket tray.

12. The cable radius anchor of claim 9, wherein the mounting portion facilitates mounting of the cable radius anchor in a side configuration relative to the wire mesh basket tray.

13. The cable radius anchor of claim 9, further comprising strengthening ribs extending along at least a portion of the length of the drop portion.

14. The cable radius anchor of claim 9, wherein the drop portion has a width greater than a width of the mounting portion.

15. A method of toollessly installing a cable radius anchor in a wire mesh basket tray comprising the steps of:
   (a) inserting a mounting portion of the cable radius anchor through a mesh opening in the wire mesh basket tray such that a drop portion of the cable radius anchor extends beneath the wire mesh basket tray;
   (b) positioning the cable radius anchor to engage an undercut tab of the mounting portion with a first wire of the wire mesh basket tray;
   (c) adjusting at least one locking tab relative to the wire mesh basket tray to secure the cable radius anchor to the wire mesh basket tray; and
   (d) positioning the cable radius anchor to engage drop ears at each side thereof with at least one additional wire of the wire mesh basket tray that is transverse to the first wire.

16. A method of toollessly installing a cable radius anchor in a wire mesh basket tray comprising the steps of:
   (a) inserting a mounting portion of the cable radius anchor through a mesh opening in the wire mesh basket tray such that a drop portion of the cable radius anchor extends beneath the wire mesh basket tray;
   (b) positioning the cable radius anchor to engage an undercut tab of the mounting portion with a first wire of the wire mesh basket tray;
   (c) adjusting at least one locking tab relative to the wire mesh basket tray to secure the cable radius anchor to the wire mesh basket tray; and
   (d) twisting the cable radius anchor to permit positioning of adjacent wires of the wire mesh basket tray within a pair of slots at either side of the drop portion of the cable radius anchor.

17. The method of claim 16, further comprising the step of untwisting the cable radius anchor to arrange the mounting portion generally flatly relative to the bottom portion of the wire mesh basket tray.

\* \* \* \* \*